US006963302B2

(12) United States Patent
Arvidsson (10) Patent No.: US 6,963,302 B2
(45) Date of Patent: Nov. 8, 2005

(54) DC/DC CONVERTER (75) Inventor: Johan Arvidsson, Åsa (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 10/746,263

(22) Filed: Dec. 29, 2003

(65) Prior Publication Data
US 2004/0178950 A1 Sep. 16, 2004

Related U.S. Application Data (63) Continuation of application No. PCT/SE01/01240, filed on Jun. 25, 2002.

(30) Foreign Application Priority Data

Jun. 27, 2001 (SE) .................................... 0102303

(51) Int. Cl.[7] .............................................. G01S 7/28
(52) U.S. Cl. .......................... 342/134; 363/13; 342/82; 342/89; 342/175
(58) Field of Search ..................... 342/82, 89, 134–144, 342/175, 202–204; 363/13, 15, 16, 20–26, 363/39, 40, 44–48, 63, 65–72, 123–124

(56) References Cited

U.S. PATENT DOCUMENTS

| | | | |
|---|---|---|---|
| 3,760,256 A | * | 9/1973 | Rast et al. ..................... 363/47 |
| 4,097,863 A | | 6/1978 | Chambers |
| 4,190,882 A | * | 2/1980 | Chevalier et al. .............. 363/26 |
| 4,737,899 A | | 4/1988 | Lorec |
| 4,814,770 A | * | 3/1989 | Reger .......................... 342/175 |
| 4,816,978 A | * | 3/1989 | Domenget et al. ....... 363/21.04 |
| 5,274,539 A | * | 12/1993 | Steigerwald et al. ........... 363/20 |
| 5,377,090 A | * | 12/1994 | Steigerwald .................. 363/20 |

FOREIGN PATENT DOCUMENTS

| | | |
|---|---|---|
| DE | 2932819 A1 | 2/1981 |
| GB | 2227133 A | 7/1990 |

OTHER PUBLICATIONS

V. Yaskiv et al., "Development of Switch Power Supplies for Radar Applications"; "Proceedings of the 2001 CIE International Conference on Radar"; pp. 851-855; Published in the year 2001 by IEEE; INSPEC Accession No. 7321149.*

* cited by examiner

Primary Examiner—Bernarr E. Gregory
(74) Attorney, Agent, or Firm—Nixon & Vanderhye P.C.

(57) ABSTRACT

A method of controlling a switching element in a switching regulator power supply of a radar. The method of controlling the switching element comprises only switching the switching element during predetermined time intervals, the predetermined time intervals advantageously being sample intervals of a pulse repetition interval of the radar. Thereby by having knowledge of the time intervals the switching element is switching, being able to remove or diminish any influence the switching can have on the quality of received signals and subsequent processing of these signals.

24 Claims, 5 Drawing Sheets

DC/DC CONVERTER

This application is a Continuation of International Application PCT/SE01/01240 filed 25 Jun. 2002, which designated the US, the entire content of which is incorporated by reference in this application.

TECHNICAL FIELD

The invention concerns DC/DC converters and is more particularly directed to the control of DC/DC converters, especially switching regulators, in radar systems and in pulse radars in particular.

BACKGROUND

There is a constant desire to be, by means of a radar, able to detect smaller and smaller objects that are further and further away. One way of achieving these aims is to increase the output power levels of the radar in question. Unfortunately this has several disadvantages, for example in an airborne radar system it is difficult to increase power consumption, as there is a very limited amount of power available. A suitable way of increasing the usability of a radar is thus to increase the sensitivity of the receiver, i.e. to be able to see more with the same output power level, or be able to see the same with a lower output power level.

At the same time there is a desire to reduce the total power consumption of a radar system, this can be achieved in many different ways. One way is to exchange linear voltage regulators with switching regulators, which have a much higher efficiency. Thus by exchanging the power supplies, power consumption of the radar system as a whole can be lowered with a maintained transmitter power output.

Unfortunately these two trends, increased receiver sensitivity and use of switching regulators, are somewhat contradictory. Switching regulators will most commonly produce more disturbances, noise, than their linear counterparts due to one or more switching elements being turned on and off, switched, for regulating purposes, at a fairly high frequency. The switching causes difficult to deal with high frequency components due to a high slew rate in the switching transitions. Receivers with increased sensitivity are unfortunately more susceptible to being influenced by any internally produced electrical noise.

There have been several attempts to come to grips with these contradictory but desirable design trends. For example U.S. Pat. No. 3,760,256 describes a power supply input drive synchronized with the pulse repetition frequency, and U.S. Pat. No. 4,737,899 describes a power supply with an electronic power commutation switch actuated at the recurrence frequency of the pulses produced by the radar. There is still room for improvement.

SUMMARY

An object of the invention is to define a method of diminishing influence of interference caused by a switched regulated power supply in a radar.

A further object of the invention is to define a method of using a switched regulated power supply in a radar.

A still further object of the invention is to define a switched regulated power supply of a radar.

The aforementioned objects are achieved according to the invention by a method of controlling a switching element in a switching regulated power supply of a radar. The method of controlling the switching element comprises only switching the switching element during predetermined time intervals, the predetermined time intervals advantageously being sample intervals of a pulse repetition interval of the radar. By having knowledge of the time intervals the switching element is switching, any influence the switching can have on the quality of received signals and subsequent processing of these signals is removed or diminished.

The aforementioned objects are also achieved according to the invention by a method of increasing a range of a radar without increasing a power consumption of the radar or keeping a range of the radar with a reduction in power consumption of the radar, by having a switching regulated power supply feeding at least a transmitter of the radar and by a method of controlling a switching element in the switching regulated power supply. The method of controlling the switching element comprises only switching the switching element during predetermined time intervals, the predetermined time intervals advantageously being sample intervals of a pulse repetition interval of the radar.

The aforementioned objects are further achieved according to the invention by a method of controlling a switching element of a switching regulator power supply of at least a transmitter stage of a pulse radar. The pulse radar transmitter transmits radar pulses by means of the transmitter stage at a pulse repetition interval. The pulse radar further comprising a receiver receiving and sampling reflected pulses at predetermined time intervals during the pulse repetition interval. According to the invention the method comprises the step of only switching the switching element of the power supply at predetermined sampling intervals of the pulse repetition interval.

Suitably the predetermined sampling intervals the switching element of the power supply is switched during are the same sampling intervals in rank during at least two pulse repetition intervals or during pulse repetition intervals of a pulse integration interval.

Advantageously the method further comprises the step of regulating the switching element of the switching regulator power supply with pulse width modulation. The step of regulating the switching element of the switching regulator power supply with pulse width modulation, regulates either by varying a time position of falling edges within their respective predetermined sampling intervals, by varying a time position of rising edges within their respective predetermined sampling intervals, or by varying a time position of falling and a time position of rising edges within their respective predetermined sampling intervals.

In some variants of the invention the method can further comprise the step of synchronizing the predetermined sampling intervals to be the same in rank of one pulse repetition interval to a next pulse repetition interval during a radar pulse of the next pulse repetition interval. In other variants the method can suitably further comprise the step of synchronizing the predetermined sampling intervals to be the same in rank of one pulse repetition interval to a next pulse repetition interval after a radar pulse of the next pulse repetition interval. Then the step of synchronizing the predetermined sampling intervals to be the same in rank of one pulse repetition interval to a next pulse repetition interval after a radar pulse of the next pulse repetition interval, can suitably be during a first sample interval after the radar pulse of the next pulse repetition interval. The step of synchronizing the predetermined sampling intervals to be the same in rank of one pulse repetition interval to a next pulse repetition interval can suitably either comprise the substep of delaying the switching of the switching element thus lengthening/extending a current control pulse of the switching element, or comprise the substep of prematurely switching the switching element thus shortening a current control pulse of the switching element.

The aforementioned objects are also achieved according to the invention by a control unit controlling the switching of a switching element of a switching regulator power supply of at least a transmitter stage of a pulse radar, to regulate the switching regulator power supply. According to the invention the control unit is arranged to control the switching of the switching element under the constraints according to any one of the previously described methods.

The aforementioned objects are also achieved according to the invention by a switching regulator power supply of at least a transmitter stage of a pulse radar. According to the invention the switching regulator power supply comprises a control unit according to any previously described embodiment.

The aforementioned objects are also achieved according to the invention by a pulse radar. According to the invention the pulse radar comprises a switching regulator power supply according to any previously described embodiment.

By providing a method of controlling a switching element according to the invention a radar with plurality of advantages over prior art radars can be obtained. Primary purposes of the invention are to provide an improved radar reception without increasing power consumption, preferably lowering the power consumption of the radar, to provide a switched regulated power supply with controllable interference, to provide a method of switching a switching element of a switched regulated power supply of a radar in such a way as to be able to filter out interference caused by the switching in a simple manner and to improve the spectral purity of a radar. Switching of switching elements in a switched regulated power supply is done so that disturbances caused by the switching are interpreted as stationary targets that can easily be removed. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 9.

Figure 1:
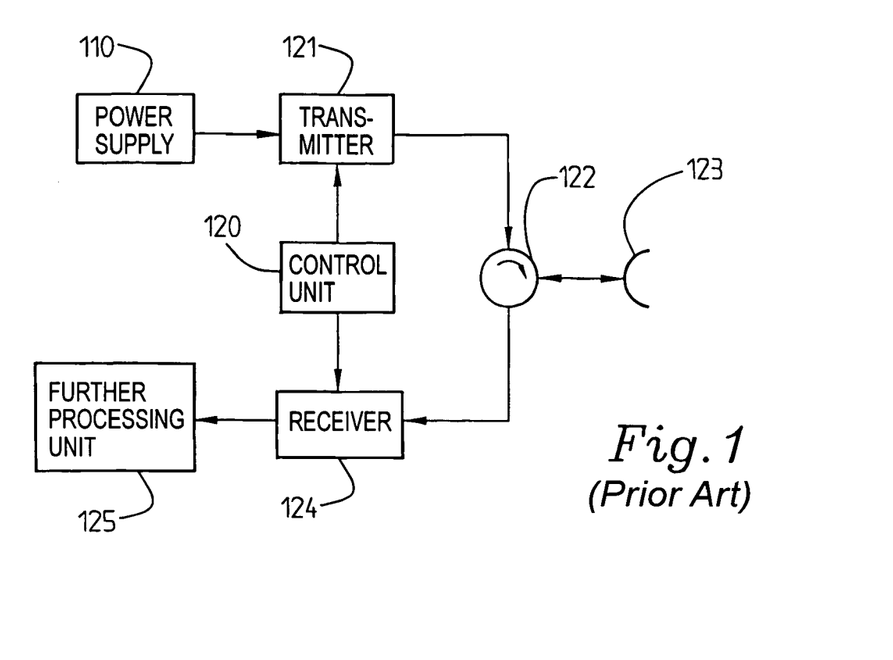
FIG. 1 shows a block diagram of a radar.

FIG. 1 shows a block diagram of a radar, typically a pulse radar with a single antenna 123 for both transmission and reception by means of the use of a circulator 122. The circulator 122 makes sure that any RF-output from the transmitter 121 does not reach the receiver 124. The sensitive receiver 124 is thus protected from any harmful power levels which might overload or even destroy a sensitive receiver 121. The transmitter 121 and the receiver 124 are commonly controlled by a control unit 120 which synchronizes the two, the receiver 124 must know when a transmission pulse is sent so that it can measure the time it takes for an echo of the transmission pulse to return. These and other calculations can be performed by either the receiver 124 itself, or by means of the receiver 124 in conjunction with a further processing unit 125. The single biggest power consumer in a radar is the transmitter 121. It is therefore the power supply 110 to the transmitter 121 which will benefit the most of being a high efficiency power supply, such as a switching regulator, instead of a low efficiency power supply, such as a voltage regulator. Great power savings in radar can be done with having a high efficiency power supply 110 to the transmitter 121. This power supply 110 can also supply the rest of the radar with power.

Figure 2:
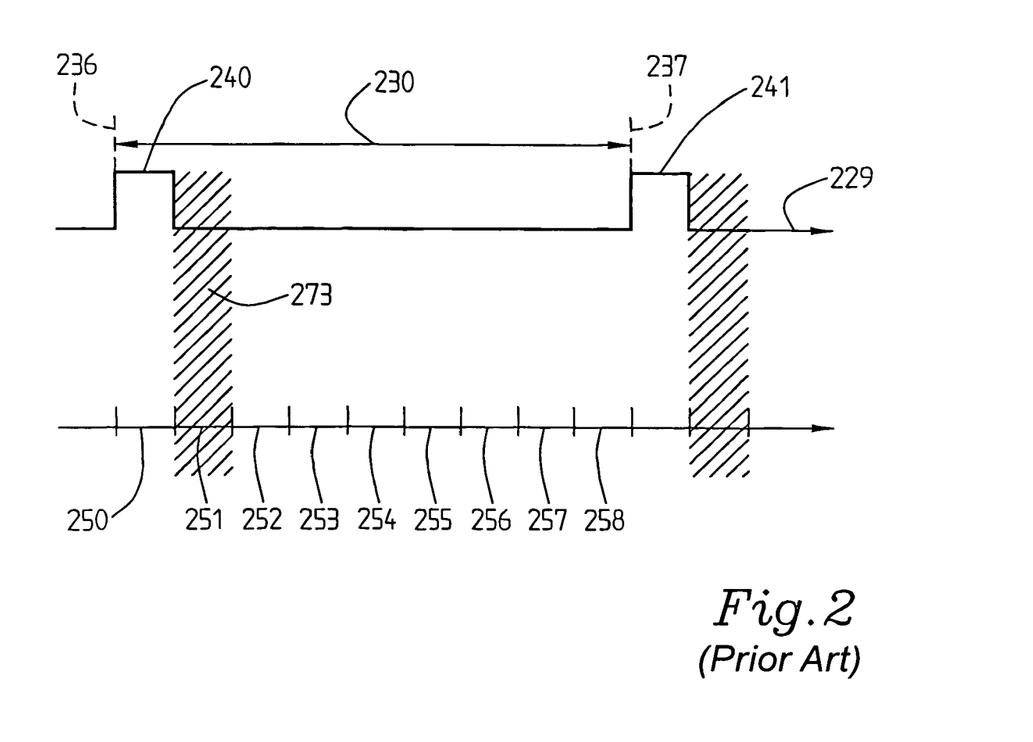
FIG. 2 shows a time diagram of transmission pulses and reception sampling in for example a radar according to FIG. 1.

FIG. 2 shows a time diagram of transmission pulses 240, 241 and reception sampling 251–258, in for example a radar according to FIG. 1, with respect to time 229. Typically the transmitter sends radar pulses 240, 241 at predetermined intervals 230, pulse repetition interval 230, PRI, which can change from time to time. The receiver samples its input at regular intervals called samples 251–258. During the transmit pulse 240, there is nothing to sample 250, the receiver is blocked by the circulator. The first sample interval 251 after the transmit pulse 240 is usually inhibited 273, mainly to avoid any strong echoes of the transmit pulse which might overload or destroy the receiver. The radar is thus blind a distance which the first one or more sample intervals 251 represent. Each sample interval 251–258, or range bin, after the transmit pulse 240 represents a distance, i.e. whatever caused an echo of the transmit pulse 240 to appear in a specific sample interval 252–258, or range bin, is at the distance that the sample interval/range bin 252–258 represents.

Figure 3:
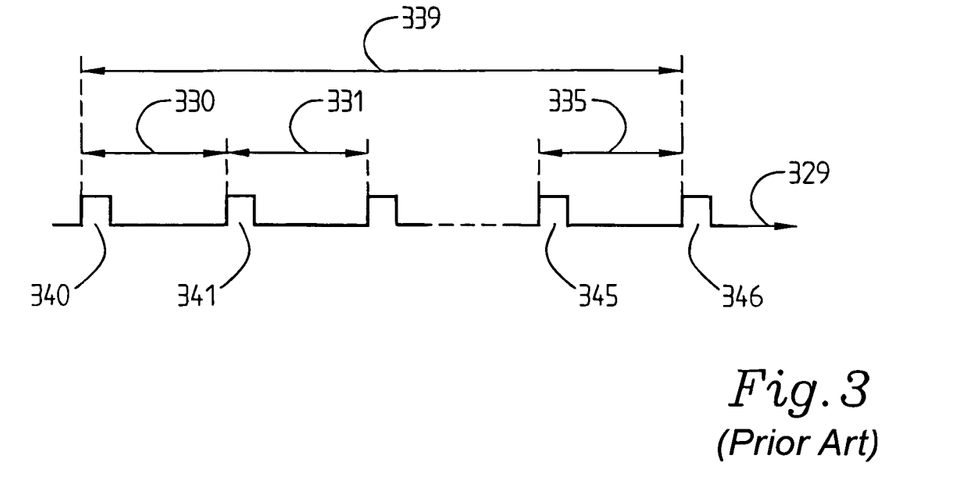
FIG. 3 shows a time diagram of integration interval.

Traditionally the information received during just a single PRI is usually not used directly. The usable information from a radar is usually the amount of information collected during an integration interval. FIG. 3 shows a time diagram 329 of an integration interval 339, INTI, which consists of a plurality of pulse repetition intervals 330, 331, 335 with their corresponding transmit pulse 340, 341, 345. The information gathered during an integration interval 339 is processed in a plurality of different ways to retrieve positional as well as directional information about possible targets. Not only wanted target data is received as echoes of the transmitted pulses, also echoes from buildings, trees and other objects will appear and clutter the desirable information. Stationary objects, i.e. objects that do not appear in different ranking samples from PRI to PRI, are usually removed by entering the frequency domain. Stationary objects will appear in samples/range bins with the same ranking, i.e. in the same samples/range bins counted from the transmit pulse.

Figure 4:
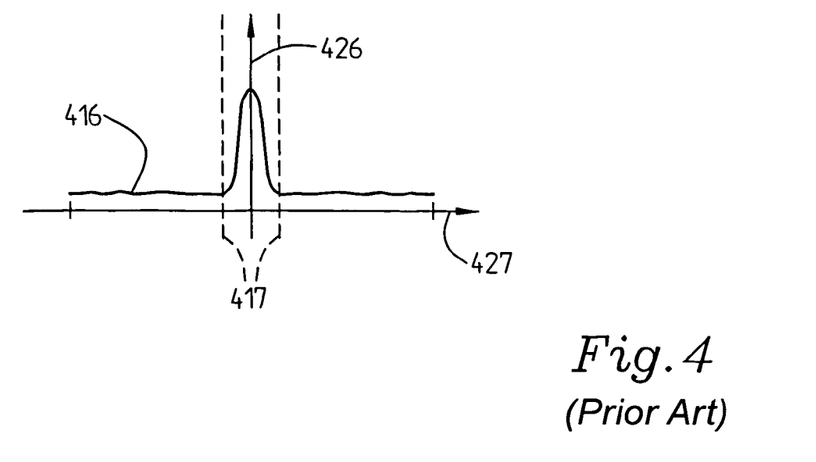
FIG. 4 shows a frequency domain spread of received signals.

FIG. 4 shows a frequency domain 427 spread 416 of received signals of one range bin/sample interval during an INTI. There are no moving targets in this distribution 416, only ground and other stationary clutter, which is between the filter markers 417, between which everything is removed. Stationary objects are removed, while changing levels in the samples from PRI to PRI are allowed to filter through and be further processed as prospective candidates for interesting targets, i.e. usually moving targets. Electrical noise within the radar will have an influence on the receiver.

Figure 5:
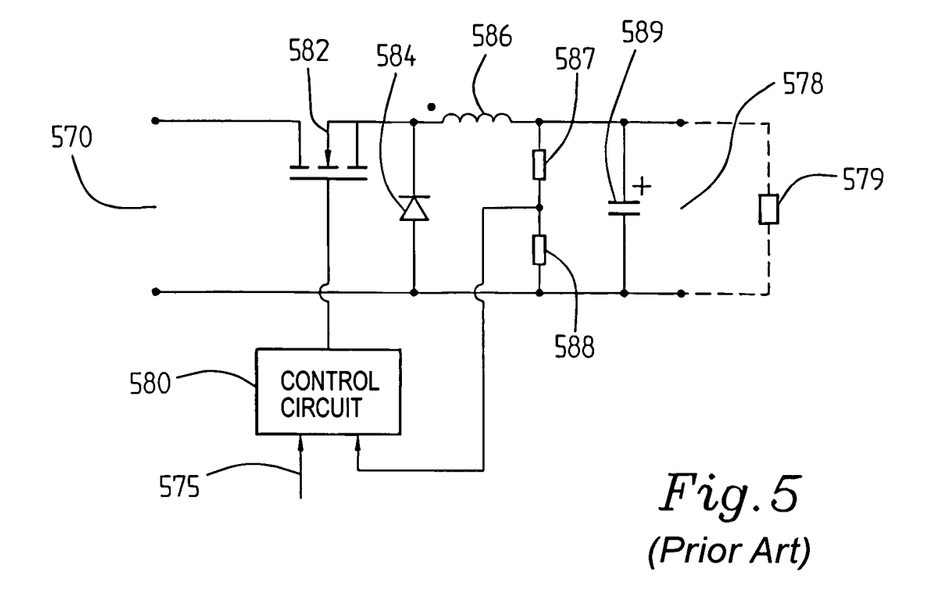
FIG. 5 shows a switching regulator, which can be regulated according to the invention.

Switching power supplies, such as that shown in FIG. 5, creates electrical noise due to the switching character of the regulator. As described previously, a proposed solution to this problem is to synchronize the switching regulator to a frequency, which is a multiple of the pulse repetition frequency, PRF, of the radar. Due to this, the time positions of one of the switching edges are known, but the time position of the other switching edge remains unknown due to load and input variations. It has been discovered that knowledge of only half of the switching edges still causes a problem with electrical noise. Another disadvantage is that the regulator is frequency controlled by the transmitter and its circumstances, which will result in that the regulating power supply has to be over dimensioned to cope with the wide range of frequencies put to it due to change in PRF. According to the invention, a switching power supply is switched at a frequency which corresponds to the designed needs of the power supply so that it can work properly at its designed ratings, this without creating problems for the receiver of the radar. Any electrical noise induced into the receiver due to the switching of a switching element of the power supply, can according to the invention easily be removed by signal filtering, such as doppler filtering.

FIG. 5 shows a switching regulator, a power supply, which can suitably be regulated according to the invention. The switching regulator comprises a power input 570, which is to be regulated into a desired output 578 which will be connected to a load 579, suitably a radar transmitter. The input 570 can either be unregulated, coarsely regulated, or at an undesirable DC voltage. The switching regulator further comprises a control circuit 580 and regulating circuitry 582, 584, 586, 589. The regulating circuitry comprises a switching element 582, a diode 584, an inductor 586, and a capacitor 589. When the switching element 582 is turned on (conducting), the capacitor 589 will be charged from the input 570 via the switching element 582 and the inductor 586. The Inductor 586 stores energy during this time period. When the switching element 582 is turned off (not conducting), the energy stored in the inductor 586 will be transferred to the capacitor 589 and to the output 578 with a return current path through the diode 584. The control circuit 580 will attain to keep a constant output voltage 578 by measuring it, commonly by means of a voltage divider 587, 588, and then controlling the frequency and/or duty cycle of the switching element 582. According to the invention the switching regulator is synchronized to switch within predetermined time intervals through a switch synchronization input 575. According to the invention both edges of the switching of the switching element 582 are within predetermined time intervals. The predetermined time intervals are during predetermined range bins, i.e. during predetermined ranked sampling intervals. According to the invention the switching regulator is synchronized to the receiver of the radar instead of to the transmitter.

Figure 6:
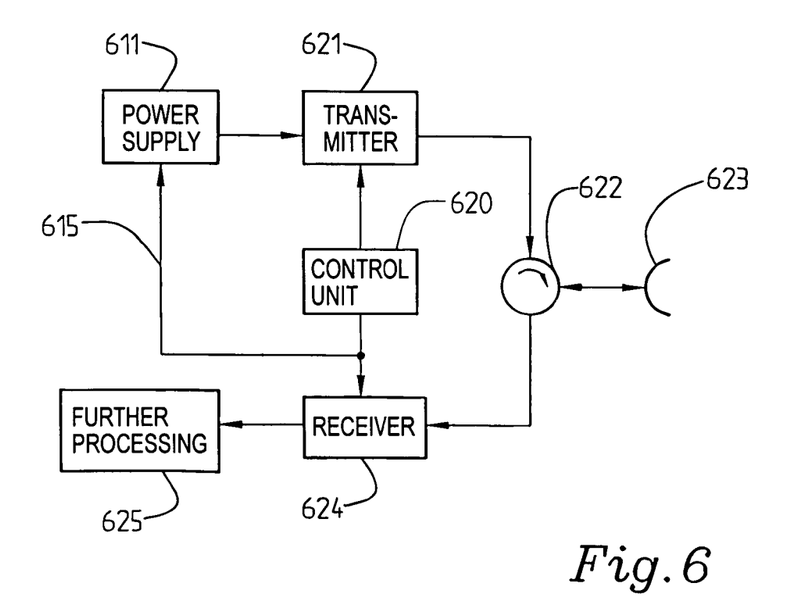
FIG. 6 shows a block diagram of a radar modified according to the invention.

FIG. 6 shows a block diagram of a radar, such as that of FIG. 1, modified according to the invention. As described previously, a radar comprises at least one antenna 623, possibly a circulator 622, a transmitter 621, a receiver 624 with possible further processing 625, and a control unit 620. According to the invention a switched regulated power supply 611 is synchronized 615 with the receiver 624. The switched regulator 611 is synchronized such that a comprised switching element is only switched during predetermined samples/range bins. The samples should preferably be the same in rank, i.e. the same counted from a respective transmit pulse, during at least two consecutive pulse repetition intervals, it can also be advantageous to only switch during the samples which are the same in rank during a complete integration interval, INTI, and possibly only change switching samples between INTI:s. According to the invention it is important to know during which samples a switching element switches, both rising and falling edges. In a preferred embodiment of the invention the time intervals, samples, that the switching element switches, do not move between different samples between different pulse repetition intervals suitably during a whole integration interval.

Figure 7:
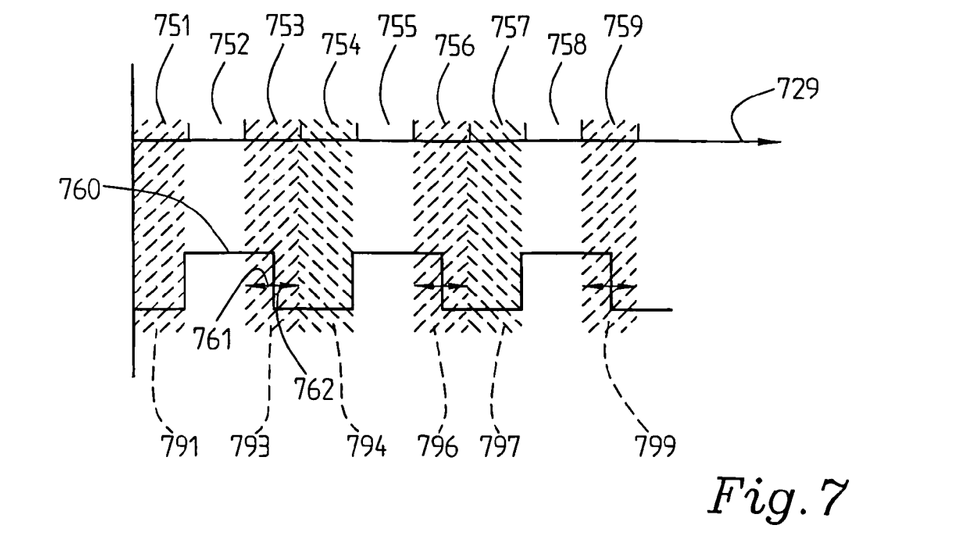
FIG. 7 shows a timing diagram of a one flank regulation.

FIG. 7 shows a timing diagram 729 of a one flank regulation according to the invention, of control pulses 760 to a switching element of a switchmode regulator power supply. The control pulses of the control pulse train 760 are chosen to switch during predetermined time intervals 791, 793, 794, 796, 797, 799, i.e. predetermined samples/range bins 751, 753, 754, 756, 757, 759, where the predetermined samples/range bins 751, 753, 754, 756, 757, 759 are chosen to attain a suitable frequency with a possible duty cycle variation which can accommodate different loads and input variations according to design requirements. Switching of the switching element is not allowed during the other samples 752, 755, 758 in this example. In this example only the falling edges are regulated/changed 761, 762 to vary the duty cycle of the control pulses 760. In other embodiments it can be only the rising edges that are regulated/changed, and in still other embodiments both edges can be used for regulation. In the example according to FIG. 7, the first sample interval 751, 791 after the transmit pulse and then every third sample interval 754, 794, 757, 797 after the transmit pulse, i.e. the first 751, 791, the fourth 754, 794, the seventh 757, 797 and so on, are predetermined/reserved for rising edges of the control pulses 760. Further according to this example the third sample interval 753, 793 after the transmit pulse and then every third sample interval 756, 796, 759, 799 are predetermined/reserved for regulating falling edges of the control pulses 760. The falling edges can either be earlier 761 in the predetermined sample intervals 753, 793, to make a shorter duty cycle, or the falling edges can be later 762 in the predetermined sample intervals 753, 793 to make a longer duty cycle.

Figure 8:
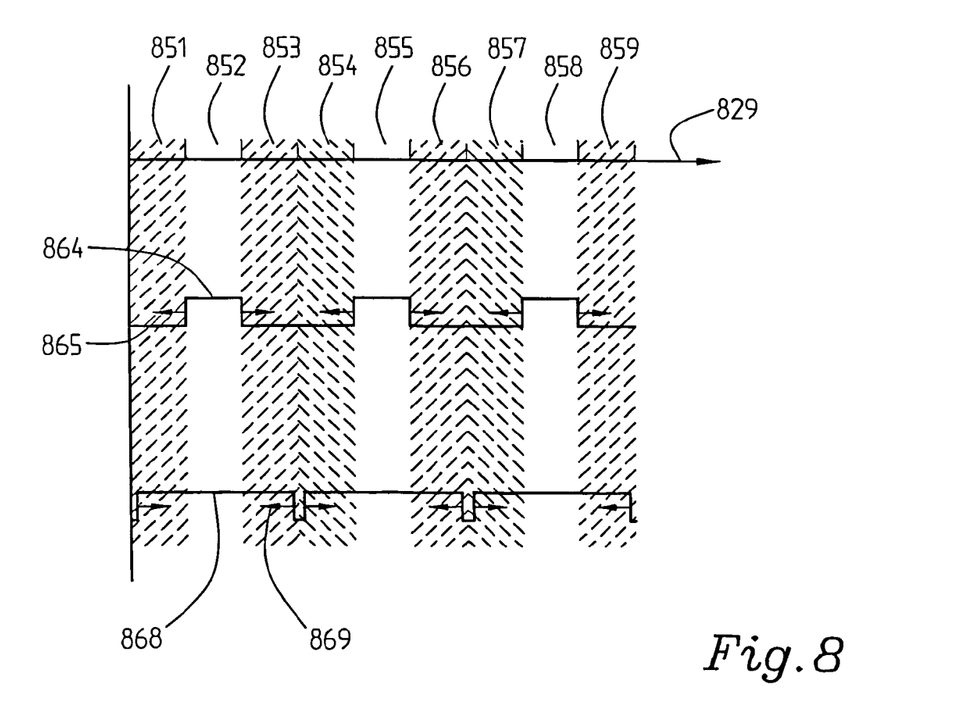
FIG. 8 shows a timing diagram of a two flank regulation.

FIG. 8 shows a timing diagram 829 of a two flank regulation. In this example two different control pulse trains 864, 868 are shown in relation to sampling intervals/range bins 851–859. The predetermined sample intervals 851, 853, 854, 856, 857, 859 are the same in rank as those for FIG. 7. The minimum duty cycle control pulse train 864 can only change its duty cycle by increasing it, 865, by either changing the time position of the falling edges and/or the rising edges. The maximum duty cycle control pulse train 868 can only change its duty cycle by decreasing it, 869, by either changing the time positions of the falling edges and/or the rising edges.

Figure 9:
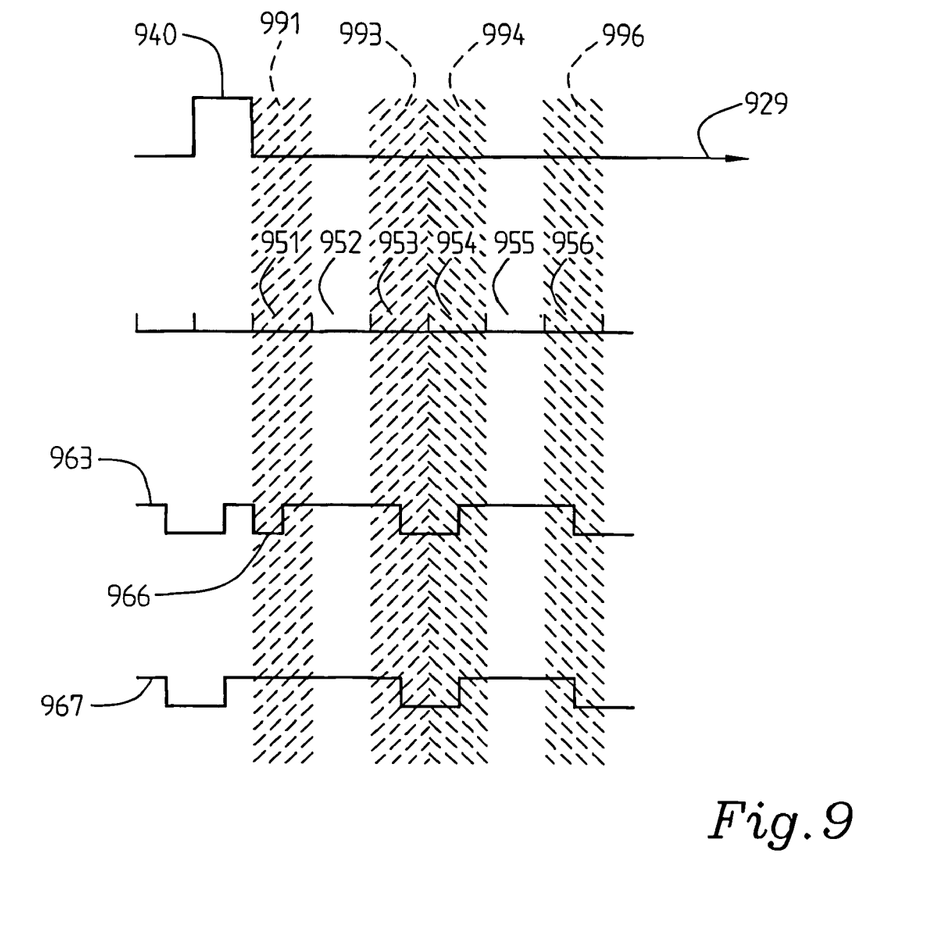
FIG. 9 shows a timing diagram of two different methods according to the invention of synchronizing switching of the switching element between two different pulse repetition intervals.

If the predetermined sample intervals were determined to be, for example as the examples above, every third sample interval, then the predetermined sample intervals will not be the same in rank from PRI to PRI unless the total number of sample intervals during a pulse repetition interval is a multiple of, in this case, three. FIG. 9 shows a timing diagram 929 of two different methods 963, 967 according to the invention of synchronizing switching of the switching element between two different pulse repetition intervals so that the predetermined sample intervals 951, 991, 953, 993, 954, 994, 956, 996 will be the same in rank from PRI to PRI.

Both of the control pulse trains 963, 967 would have a switching interval during the second sample interval 952 after the transmit pulse 940 of the current pulse repetition interval if there is no synchronization. This can indeed be desirable in some situations, for example when going from one INTI to another INTI and the predetermined sampling intervals in rank for switching purposes are changed. In a preferred embodiment, the same predetermined sampling intervals in rank are used for switching of a switching element during the pulse repetition intervals of an integration interval. According to the invention an extra synchronization pulse 966 can be added to the control pulse 963 during for example a normal predetermined sample interval 951, 991, instead of a falling edge in the second sample interval 952, i.e. both a falling edge and a rising edge is added in one predetermined sample interval in rank 991 where normally, in this example, only a rising edge would be. A second method of synchronization according to the invention is to prolong a current pulse 967, skipping, according to this example, both a falling edge in the second sample interval 952 and a rising edge in the predetermined sample interval in rank 991. The synchronization can for example take place during the transmit pulse 940, during the first sample interval 951 after a transmit pulse since the receiver is usually inhibited during this time interval, or during a first predetermined sample interval in rank 991 after the transmit pulse 940 as long as the control pulse train 963, 967 in question does not have a switching after the transmit pulse 940, or after the first sample interval 951, and before the predetermined sample interval 991 in question. The type of synchronization method used can be in dependence of design considerations, i.e. the type of sync is chosen once and for all, or it can be in dependence on a current load situation, i.e. the type of synchronization is chosen dynamically from PRI to PRI depending on the current situation.

The basic principle of the invention is to control a switching element of a switching regulator power supply of a radar, to only switch during predetermined time intervals, the predetermined time intervals being in synchronization with a receiver of the radar, and specifically the predetermined time intervals are sample intervals. In a preferred embodiment the predetermined sample intervals/range bins are the same in rank from PRI to PRI during an INTI. Any disturbances introduced into the receiver due to the switching of the switching element will then automatically be filtered away as the disturbances will be interpreted as stationary objects.

The invention is not restricted to the above described embodiments, but may be varied within the scope of the following claims.

E42p46PCT SPB

FIG. 1
110 power supply,
120 control unit,
121 transmitter,
122 circulator,
123 antenna,
124 receiver,
125 further processing unit.

FIG. 2
229 time axis,
230 pulse repetition interval, PRI,
236 transmit pulse marker,
237 transmit pulse +1 marker,
240 a transmit pulse,
241 a transmit pulse +1,
250 sample interval during transmit pulse,
251 first sample interval/range bin after transmit pulse,
252–258 samples/sample intervals/range bins,
273 receiver inhibit time interval after transmit pulse.

FIG. 3
329 time axis,
330 first pulse repetition interval,
331 second pulse repetition interval,
335 last pulse repetition interval,
339 integration interval, INTI,
340 first transmit pulse,
341 second transmit pulse,
345 last transmit pulse,
346 first transmit pulse of next INTI.

FIG. 4
416 frequency domain distribution,
417 filtering markers,
426 domain distribution amplitude axis,
427 frequency axis.

FIG. 5
570 DC input voltage,
575 switch synchronization input,
578 DC output voltage,
579 load,
580 converter controller/regulator
582 switch element,
584 diode,
586 energy storage, inductor,
587 voltage divider element 1,
588 voltage divider element 2,
589 output smoothing capacitor.

FIG. 6
611 power supply,
615 receiver synchronization signals to power supply,
620 control unit,
621 transmitter,
622 circulator,
623 antenna,
624 receiver,
625 further processing.

FIG. 7
729 time axis,
751–759 samples,
760 control pulse train to switch switching element in power supply unit, variable falling edge,
761 earlier falling edge of control pulses,
762 later falling edge of control pulses,
791 time during sample 751 for control pulse switching, rising edge,
793 time during sample 753 for control pulse switching, falling edge,
794 time during sample 754 for control pulse switching, rising edge,
796 time during sample 756 for control pulse switching, falling edge,
797 time during sample 757 for control pulse switching, rising edge,
799 time during sample 759 for control pulse switching, falling edge.

FIG. 8
829 time axis,
851–859 samples, 864 control pulse train to switch switching element in power supply unit, variable falling and rising edges, minimum duty cycle,
865 rising and falling edges can only move to increase pulse width,
868 control pulse train to switch switching element in power supply unit, variable falling and rising edges, maximum duty cycle,
869 rising and falling edges can only move to decrease pulse width.

FIG. 9
929 time axis,
951–956 samples,
940 transmit pulse,
963 control pulse train to switch switching element in power supply unit, synchronized to current pulse repetition interval by means of an additional switching 966 of the switching element, thus shortening a started control pulse,
966 extra synchronization pulse,
967 control pulse train to switch switching element in power supply unit, synchronized to current pulse repetition interval by means of an extension of a started control pulse,
991 time during sample 951 for control pulse switching, rising edge,
993 time during sample 953 for control pulse switching, falling edge,
994 time during sample 954 for control pulse switching, rising edge,
996 time during sample 956 for control pulse switching, falling edge.

What is claimed is:

1. A method of controlling a switching element of a switching regulator power supply of at least a transmitter stage of a pulse radar, the pulse radar transmitter stage transmitting radar pulses at a pulse repetition frequency interval, the pulse radar further comprising a receiver receiving and sampling reflected pulses at predetermined time intervals during the same pulse repetition frequency interval the method comprising:
   only switching the switching element of the power supply on and off at predetermined sampling intervals of the pulse repetition frequency interval during one integration interval.

2. The method of controlling a switching element of a switching regulator power supply of at least a transmitter stage of a pulse radar according to claim 1, wherein the predetermined sampling intervals the switching element of the power supply is switched during are the same sampling intervals in position during at least two pulse repetition intervals.

3. The method of controlling a switching element of a switching regulator power supply of at least a transmitter stage of a pulse radar according to claim 1, wherein the predetermined sampling intervals the switching element of the power supply is switched during are the same sampling intervals in position during pulse repetition intervals of a pulse integration interval.

4. The method of controlling a switching element of a switching regulator power supply of at least a transmitter stage of a pulse radar according to claim 1, wherein the method further comprises the step of:
   regulating the switching element of the switching regulator power supply with pulse width modulation.

5. The method of controlling a switching element of a switching regulator power supply of at least a transmitter stage of a pulse radar according claim 4, wherein the step of regulating the switching element of the switching regulator power supply with pulse width modulation, regulates by varying a dine position of falling edges within their respective predetermined sampling intervals.

6. The method of controlling a switching element of a switching regulator power supply of at least a transmitter stage of a pulse radar according claim 4, wherein the step of regulating the switching element of the switching regulator power supply by pulse width modulation, regulates by varying a time position of rising edges within their respective predetermined sampling intervals.

7. The method of controlling a switching element of a switching regulator power supply of at least a transmitter stage of a pulse radar according claim 4, wherein the step of regulating the switching element of the switching regulator power supply by pulse width modulation, regulates by varying a time position of falling and a time position of rising edges within their respective predetermined sampling intervals.

8. The method of controlling a switching element of a switching regulator power supply of at least a transmitter stage of a pulse radar according to claim 1, wherein the method further comprises the step of:
   synchronizing the predetermined sampling intervals to be the same in rank of one pulse repetition interval to a next pulse repetition interval during a radar pulse of the next pulse repetition interval.

9. The method of controlling a switching element of a switching regulator power supply of at least a transmitter stage of a pulse radar according to claim 8, wherein the step of synchronizing the predetermined sampling intervals to be the same in position of one pulse repetition interval to a next pulse repetition interval comprises the substep of delaying the switching of the switching element thus lengthening a current control pulse of the switching element.

10. The method of controlling a switching element of a switching regulator power supply of at least a transmitter stage of a pulse radar according to claim 8, wherein the step of synchronizing the predetermined sampling intervals to be the same in position of one pulse repetition interval to a next pulse repetition interval comprises the substep of prematurely switching the switching element thus shortening a current control pulse of the switching element.

11. The method of controlling a switching element of a switching regulator power supply of at least a transmitter stage of a pulse radar according to claim 1, wherein the method further comprises the step of:
   synchronizing the predetermined sampling intervals to be the same in position of one pulse repetition interval to a next pulse repetition interval after a radar pulse of the next pulse repetition interval.

12. The method of controlling a switching element of a switching regulator power supply of at least a transmitter stage of a pulse radar according to claim 11, wherein the step of synchronizing the predetermined sampling intervals to be the same in position of one pulse repetition interval to a next pulse repetition interval after a radar pulse of the next pulse repetition interval, is during a first sample interval after the radar pulse of the next pulse repetition interval.

13. A switching regulator power supply for use with at least a transmitter stage of a pulse radar where a pulse radar transmitter transmits radar pulses at a pulse repetition frequency interval and a pulse radar receiver receives and samples reflected pulses at predetermined time intervals during the same pulse repetition frequency interval, comprising:
   a switching element, and control circuitry for only switching the switching element of the power supply on and off at predetermined sampling intervals of the pulse repetition interval during one integration interval.

14. The switching regulator power supply according to claim 13, wherein the control circuitry is configured to switch the switching element during the same sampling intervals in position during at least two pulse repetition intervals.

15. The switching regulator power supply according to claim 13, wherein the control circuitry is configured to regulate the switching element with pulse width modulation by varying a time position of falling edges within their respective predetermined sampling intervals.

16. The switching regulator power supply according to claim 13, wherein the control circuitry is configured to regulate the switching element with pulse width modulation by varying a time position of rising edges within their respective predetermined sampling intervals.

17. The switching regulator power supply according to claim 13, wherein the control circuitry is configured to regulate the switching element with pulse width modulation by varying a time position of falling and a time position of rising edges within their respective predetermined sampling intervals.

18. The switching regulator power supply according to claim 13, further comprising:
means for synchronizing the predetermined sampling intervals to be the same in position of one pulse repetition interval to a next pulse repetition interval during a radar pulse of the next pulse repetition interval.

19. The switching regulator power supply according to claim 13, further comprising:
means for synchronizing the predetermined sampling intervals to be the same in position of one pulse repetition interval to a next pulse repetition interval after a radar pulse of the next pulse repetition interval.

20. The switching regulator power supply according to claim 19, further comprising:
means for delaying the switching of the switching element thus lengthening a current control pulse of the switching element.

21. The switching regulator power supply according to claim 19, further comprising:
means for prematurely switching the switching element thus shortening a current control pulse of the switching element.

22. A pulse radar comprising:
an antenna;
a transmitter coupled to the antenna for transmitting radar pulses at a pulse repetition frequency interval;
a receiver coupled to the antenna for receiving and sampling reflected pulses at predetermined time intervals during the same pulse repetition interval;
a switching regulator power supply coupled to the transmitter and including a switching element; and
control circuitry for only switching the switching element of the power supply on and off at predetermined sampling intervals of the pulse repetition interval during one integration interval.

23. The pulse radar according to claim 22, wherein the control circuitry is configured to switch the switching element during the same sampling intervals in position during at least two pulse repetition intervals.

24. The pulse radar according to claim 23, wherein the control circuitry is configured to regulate the switching element with pulse width modulation by varying a time position of rising edges, falling edges, or both rising and falling edges within their respective predetermined sampling intervals.

* * * * *